(12) United States Patent
Kahen et al.

(10) Patent No.: US 8,181,684 B2
(45) Date of Patent: May 22, 2012

(54) AUTOMATIC TRACTION DEVICE

(76) Inventors: Soleyman Kahen, Los Angeles, CA (US); Keyvan T. Diba, Los Angeles, CA (US)

(*) Notice: Subject to any disclaimer, the term of this patent is extended or adjusted under 35 U.S.C. 154(b) by 620 days.

(21) Appl. No.: 12/214,608

(22) Filed: Jul. 24, 2008

(65) Prior Publication Data

US 2009/0188597 A1    Jul. 30, 2009

(51) Int. Cl.
B60C 11/00     (2006.01)
B60C 27/00     (2006.01)
(52) U.S. Cl. .................................. 152/216; 152/226
(58) Field of Classification Search .................. 152/216, 152/225 R, 226; 301/45, 47
See application file for complete search history.

(56) References Cited

U.S. PATENT DOCUMENTS

| | | | |
|---|---|---|---|
| 1,257,145 A * | 2/1918 | Stern .............................. | 152/216 |
| 1,488,333 A * | 3/1924 | Force et al. .................... | 188/4 B |
| 1,787,608 A | 1/1931 | Ansell | |
| 2,494,850 A * | 1/1950 | Williams ....................... | 152/216 |
| 2,754,874 A | 7/1956 | Gardner | |
| 2,770,280 A * | 11/1956 | Fries et al. .................... | 152/216 |
| 2,897,868 A * | 8/1959 | Putt et al. ...................... | 152/216 |
| 2,947,336 A | 8/1960 | Gutierrez | |
| 3,016,078 A | 1/1962 | Schmidt | |
| 3,071,173 A | 1/1963 | Hoffman | |
| 3,078,902 A | 2/1963 | Scheiduinger | |
| 3,089,528 A * | 5/1963 | Aler ............................... | 152/216 |
| 3,112,784 A | 12/1963 | Montenare | |
| 3,120,256 A * | 2/1964 | Sekelsky ........................ | 152/218 |
| 3,190,335 A * | 6/1965 | Isaacman ....................... | 152/216 |
| 3,482,617 A * | 12/1969 | Chamberlain et al. ........ | 152/214 |
| 3,861,752 A | 1/1975 | Thurre et al. | |
| 4,120,336 A | 10/1978 | Baskall | |
| 4,355,451 A | 10/1982 | Thomas | |
| 4,576,214 A | 3/1986 | Pruesker | |
| 4,643,251 A | 2/1987 | Ziccardi et al. | |
| 4,852,948 A | 8/1989 | Vagias | |
| 4,883,104 A | 11/1989 | Minami | |
| 4,906,051 A | 3/1990 | Vilhaeur, Jr. | |
| 4,960,159 A | 10/1990 | Oda | |
| 5,070,923 A | 12/1991 | Tanaka | |
| 5,156,695 A | 10/1992 | Martin | |
| 5,242,214 A * | 9/1993 | Granryd ......................... | 301/45 |
| 5,254,187 A | 10/1993 | Metraux | |
| 5,501,482 A | 3/1996 | McClive | |
| 5,540,267 A | 7/1996 | Rona | |
| 5,645,659 A | 7/1997 | Ivan | |
| 6,101,800 A * | 8/2000 | Juraco et al. .................. | 56/504 |
| 6,341,635 B1 | 1/2002 | Robeson | |
| 7,174,935 B2 | 2/2007 | Kahen | |
| 7,448,421 B2 * | 11/2008 | Kahen ........................... | 152/216 |
| 2004/0089385 A1 * | 5/2004 | Kahen ........................... | 152/185 |
| 2006/0096683 A1 | 5/2006 | Kahen | |

* cited by examiner

*Primary Examiner* — Jason Bellinger
(74) *Attorney, Agent, or Firm* — Robert J. Lauson; Lauson & Tarver LLP (57) ABSTRACT

The problem of damage sustained to a traction device and the extendable traction elements thereof due to tire-roadway interaction forces exerted on the traction elements while extended over the tire tread area is solved by resiliently coupling a traction assembly within a tire rim to permit movement and repositioning of the traction assembly relative to the rim and biasing back to the original position. Preferably the traction assembly is mounted to a traction hub through a resilient coupling, and with the traction hub permitted to rotate relative to the rim. Also preferably, the invention provides for full retraction of the curved traction elements. This inventive device delivers increased traction in slippery conditions while protecting the traction device and surrounding mechanics from damage due to the impact of various roadway forces, and the device is effectively stowed within the rim when not in use.

13 Claims, 8 Drawing Sheets

FIG. 9

AUTOMATIC TRACTION DEVICE

RELATED APPLICATION DATA

This application claims the priority date of provisional application no. 60/936,590 filed on Jun. 21, 2007.

BACKGROUND OF THE INVENTION

1. Field of the Invention

The present invention relates to an automatic traction device to increase traction in snow, ice, or other slippery conditions, and more particularly to a means to protect the traction device from damage due to tire-roadway interaction forces.

2. Description of the Related Art

In snow, ice or other slippery conditions a driver may choose to supplement the traction of a standard tire with snow chains, or preferably a retractable automatic traction device that can be fitted within a rim and configured to extend a plurality of traction elements over the tread area of a tire. Examples of an automatic traction device are disclosed in Kahen U.S. Pat. No. 7,174,935 and Kahen US 2006/0096683, the disclosures of which are incorporated herein by this reference.

It is known that the interaction area or contact zone between the road and tire is a high stress region, with multiple tire-roadway interaction forces. These tire-roadway interaction forces can be caused by the weight and speed of the vehicle exerted on the rolling tires through rough road conditions, potholes and other changes in road conditions that can cause impact forces. The traction elements are designed to extend over portions of the tire tread, between the roadway and tread, covering the tread in spaced strips radially about the tire within this high stress region.

If the tire, with the traction elements extended thereover, encounters rough road conditions or potholes, the traction elements can be resultantly impacted and deflected due to the impact forces. If the traction element is rigidly coupled to the body of the automatic traction device, a substantial deflection could cause damage to the traction element or the traction device body, or both. Even repeated smaller deflections can cause fatigue and eventual failure over time or given life cycle. Since the traction elements are designed with a degree of stiffness to remain extended over the tread with substantial stability, they may absorb these forces well.

A large deflection could potentially damage parts of the traction device, such as the gearing, motor and other internal parts. A large enough deflection could also shear the traction element, causing it to fly off the tire with great velocity, having the potential to cause damage to cars or people. Therefore, traction device failure is undesirable not only for financial reason but also for safety reasons.

Although, the traction devices in the above-mentioned prior art references permit the traction element to extend over the tread area and selective retract off the tread area, they lack design provisions to absorb or otherwise address these tire-roadway interaction forces. Other automatic traction devices also fail to address this shortfall, such as the traction device disclosed in U.S. Pat. No. 5,540,267 to Rona. Rona's grip assemblies are rigidly coupled to the central hub, so all of the deflection is absorbed through the grip assemblies. A substantial force could easily deflect the grip assemblies to the point of breakage or damage to the other components.

Yet another shortcoming of previous attempts to mate an automatic traction device to a tire rim, such as in US 2006/0096683, is the inability to permit full retraction of the curved traction elements within the rim when the curvature of the curved traction elements is greater than the curvature of the inner diameter surface of the rim when measured cross sectionally through the central axis, the curvature being defined as the inverse of the radius. If the curvature of the curved traction element is greater than the rim's curvature, then the curved traction element's retraction will be hindered by contact with the rim. Basically, the rim does not provide the necessary clearance and the traction element does not yield. This limits the design options available for the rims and traction elements.

Accordingly, there has been a long-felt need in the art for an automatic traction device that is not adversely affected by the impacts on the traction elements due to tire-roadway interaction forces. This device should respond to the impacts with the roadway without substantial or catastrophic damage to the traction element, the device, the vehicle or nearby people. This system should also respond to impact forces from multiple directions.

OBJECTS OF THE INVENTION

It is an object of the present invention to provide an improved automatic traction device that substantially prevents damage due to tire-roadway interaction forces;

It is a further object of the present invention to provide an improved means to couple the traction assemblies on the traction device, such that the coupling elastically deflects and absorbs transmitted forces;

It is a further object of the present invention to provide an improved traction device that permits translation and rotation of the traction assembly with multiple degrees of freedom;

It is yet a further object of the present invention to provide a biasing means to restore the traction assembly back to or near its previous position after being elastically deflected or translated or rotated due to roadway or other forces; and, It is yet a further object of the present invention to provide an improved traction device that provides a means to accommodate the traction elements when in a retracted mode.

These and other advantages and attainments of the present invention will become apparent to those skilled in the art upon a reading of the following detailed description when taken in conjunction with the drawings wherein there is shown and described an illustrative embodiment of the invention.

SUMMARY OF THE INVENTION

The present invention is directed to a novel automatic traction device for preventing damage to the device and its components, as well at surrounding objects and people due to tire-roadway interaction forces. The present invention provides a means to elastically couple the traction assembly to the traction device to permit nondestructive elastic deflection, or translation and rotation with multiple degrees of freedom. The present invention also provides a biasing means to restore the traction assembly back to or near its original position. Additionally, the present invention also provides a means to accommodate the traction elements when in a retracted mode without undue interference with the retraction operation.

The problem of damage sustained to a traction device and the extendable traction elements thereof due to tire-roadway interaction forces exerted on the traction elements while extended over the tire tread area is solved by resiliently coupling a traction assembly within a tire rim to permit the repositioning of the traction assembly relative to the rim. In a preferred embodiment of the present invention a traction device is provided with a traction assembly having said traction element slidably fitted therein and being resiliently coupled within the rim to permit the repositioning of the traction assembly in response to a tire-roadway interaction force exerted on and transmitted through the traction element while extended over a tire tread. As an option, the traction assembly may be resiliently coupled by a resilient coupling means.

As used in this specification and the appended claims, the term "tire-roadway interaction force" means forces exerted on the traction elements due to the tire contacting a driving surface or the traction element contacting the driving surface. Likewise, the terms "traction device" and "automatic traction device" mean a device attached to the rim of a vehicle and configured to selectively extend a traction element over a tire tread to increase traction in slippery conditions. Again, likewise, the terms "traction element" and "curved traction element" mean the retractable portion of the traction device that can be selectively extended and retracted, having traction enhancing means at a free end which is configured to overlie the tire tread. Also, likewise, the terms "rim" and "wheel" mean any number of devices configured to support a tire through the hermetic engagement of the tire to a rim flange, whether the rim is made of two or more pieces, usually with a cylindrical sleeve supported by a central disc or spokes, or one piece, often made by a casting or forging process.

Yet another preferred embodiment of the present invention the traction device includes a traction hub coupled to a rim, a traction assembly with a traction element slidably fitted within, and a resilient coupling means that joins the traction assembly to the traction hub. This resilient coupling means permits the traction assembly to deflect relative to the traction hub, in response to tire-roadway interaction forces exerted on the traction elements. These forces are transmitted through the traction elements and thereafter substantially absorbed by the resistive deflection of the resilient coupling means.

The traction hub is preferably mounted to the rim within the cylindrical sleeve of the rim, preferably on the inner side of the wheel. The outer diameter of the traction hub is generally smaller than the rim inner diameter or cylindrical sleeve inner diameter to provide clearance therebetween, for the radial mounting of at least one and preferably a plurality of traction assembly, each having one traction element slidably fitted therein.

Optionally, a torsion spring or other biasing means may be used to bias the traction assembly towards the rim inner diameter. A torsion spring may be installed over the pin of the leaf, to provide a rotational bias about the pin to urge the traction assembly towards the rim inner diameter. The torsion spring may optionally, have two legs each having attached at a terminus a ball configured to mate within a respective socket on the traction hub outer diameter to form a ball and socket joint at each leg. This arrangement provides a degree of control to the overall deflection of the resilient coupling and biases the traction assembly as discussed, yet still facilitates deflection of the traction element with multiple degrees of freedom.

Mechanically, the traction element is coupled to the traction hub by the resilient coupling means, the torsion spring serves to maintain a bias towards the traction assembly's original position, basically bringing the traction assembly back to an equilibrium position after the force induced repositioning. The torsion spring follows the repositioning of the traction assembly through all six degrees of freedom over which motion is permitted by the resilient coupling means, including translation in three axes and rotation about three axes.

In an alternate embodiment, the traction hub is rotatably coupled to the rim about common wheel rotation axis through a rotatable coupling, permitting the rotation of the traction hub in response to tire-roadway interaction forces. It is important to note that the rotation is permitted only when a substantial force is transmitted through the traction elements; free spinning rotation is not usually desired. Therefore the rotatable coupling may preferably provide resistive rotation through a variety of common means, such as a bearing or other appropriate means. Optionally, in the case wherein the traction assembly is biased towards the rim inner diameter, the traction assembly may include a roller on the housing configured to contact the rim inner diameter to substantially prevent the traction assembly from abrading the rim inner diameter during rotation In yet another embodiment of the present invention, resilient coupling means is an elastomeric leaf, in a similar manner of a leaf in a standard hinge, being configured to be secured to the traction hub at a fixed end and pivotally coupled to the traction assembly at a free end through a pin; except, unlike a standard hinge leaf, the elastomeric leaf is flexible, being made from rubber or other similar elastic material. The pin can either be integrally formed with the elastomeric leaf or be a separate component, such as a metal pin. The elastomeric leaf permits the rotation of the traction assembly about a tangent to the hub and also provides flexibility is multiple directions through the elastic deformation of the elastomeric leaf. The elastomeric leaf should be designed so that it can provided resistive deflection in response to forces without sustaining substantial permanent deformation. Optionally, the resilient coupling means can be a compression spring or other appropriate spring.

In yet another embodiment of the invention a means for accommodating a curved traction element of a traction device mounted within an inner diameter of a tire rim is provided. The traction device is configured to selectively extend the curved traction element over the tread of the tire and selectively retract the curved traction element within the inner diameter. The means for accommodating a curved traction element permits the retraction of the curved traction element without dysfunctional interference between the rim and the curved traction element.

Optionally this means for accommodating a curved traction element could be a recess formed on the inner diameter and configured to provide clearance for a portion of the curved traction element while retracted. Basically, because the curvature of the curved traction elements is greater than the curvature of the inner diameter surface of the rim the curved traction element's retraction will be hindered by contact with the rim if not for the recess. The recess provides the necessary clearance for the curved traction element to fully retract. This clearance may optionally be annular to provide all of the traction elements appropriate clearance, even in the case of the traction hub rotating, carrying the traction assemblies and traction elements through an arcuate path, necessitating an annular clearance, such as a trough about the inner diameter or sleeve.

In yet another optional embodiment, the means for accommodating a curved traction element comprises a curved traction element with a free end and a secured end configured to deform when retracted upon contact with the inner diameter. The free end of the curved traction element is configured to extend over the tire tread to provide enhanced traction, while the secured end is slidably joined within the traction assembly. The traction assembly is designed to permit the passage of the curved traction element therethrough, so that the secured end contacts the inner diameter of the rim, deforming and deflecting as a result.

To permit adequate flexure of the secured end of the traction element, the secured end can be made of a different material than the free end. The material chosen for the secured end is preferably more flexible than the remainder of the traction element. In other words, the Young's modulus of the free end material is greater than the Young's modulus of the secured end material. This flexibility permits the device to be used with industry standard rims without substantial modification.

A method for preventing damage to a traction device due to a tire-roadway interaction force exerted on an extendable traction element thereof is also provided. This method includes resiliently coupling a traction assembly within a rim and permitting the repositioning of the traction assembly from an initial position in response to the tire-roadway interaction force. Optionally, the method can include the further step of urging the traction assembly back to said original position in the absence of said tire-roadway interaction force. Optionally, a further step may include providing a traction hub with the traction assembly resiliently mounted thereon and permitting the rotation of the traction hub relative to the rim in response to the tire-roadway interaction force. Yet another optional step may include providing a recess within an inner diameter of the rim configured to provide clearance for a portion of the extendable traction element while retracted within the rim.

LISTING OF REFERENCE NUMERALS OF FIRST-PREFERRED EMBODIMENT traction device 20
traction element 22
portion 23
traction assembly 24
housing 25
resilient coupling means 26
biasing means 28
pin 30
elastomeric leaf 32
slot 33
torsion spring 34
ball 36, 38
free end 40
fixed end 42
traction hub 44
roller 46
socket 48
ball and socket joint 50
industry standard rim 52
custom rim 54
tire 56
hub 58
tire tread 60
rotatable coupling 62
traction hub outer diameter 64
rim inner diameter 66
annular recess 68
motor 70
actuator 72
means 74
curved traction element 76
secured end 78
free end 80
free end material 82
secured end material 84
housing half 86
roller pin 88
sleeve 90
first leg 92
second leg 94
counterbalance 96
drive gear 98
guide roller 100
hole 102
drive 104
axis 104, 106, 108, 110

DESCRIPTION OF THE PREFERRED EMBODIMENTS

Figure 1A:
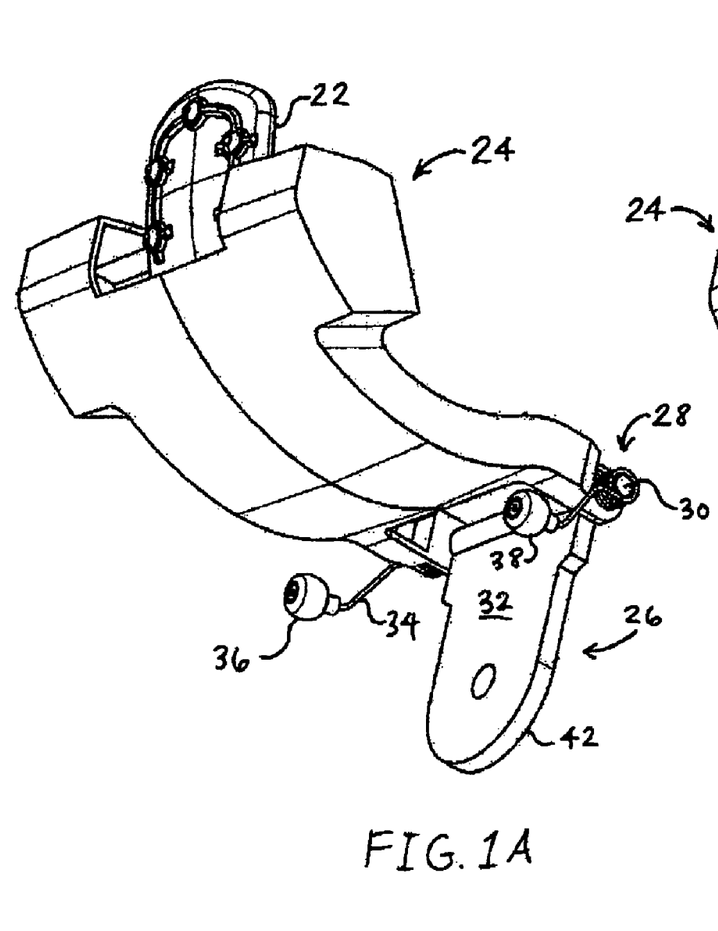
FIGS. 1A-B is are perspective views of the preferred embodiment of the present invention, showing the traction assembly and the resilient coupling means with the traction element in the retracted and extended modes.
Figure 1B:
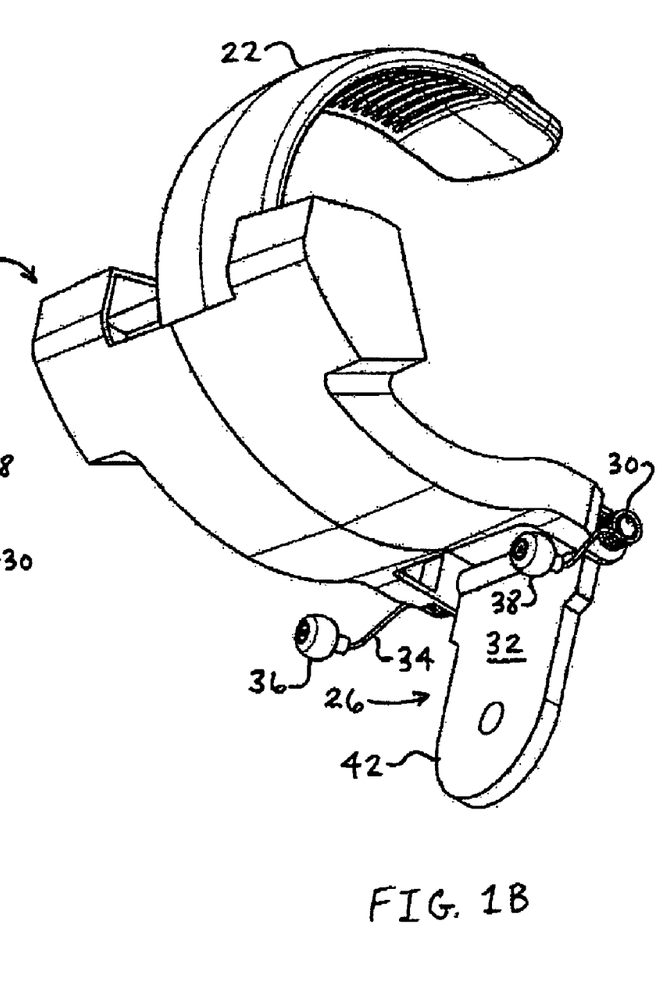

Looking first at FIGS. 1A and 1B, the traction assembly 24 containing the traction element 22 is shown uninstalled from the traction device 20 and rim for the sake of clarity. FIG. 1A shows the traction element 22 in the retracted mode; and FIG. 1B shows the tractions element 22 in the extended mode. These modes will be described more specifically in the description of FIGS. 5A-B. The preferred embodiment of the resilient coupling means 26 is shown, with the elastomeric leaf 32 attached to the housing 24 through pin 30, which permits rotation of the traction assembly 24 about the pin 30. The biasing means 28 is preferably a torsion spring 34, although other means to bias the traction assembly are available for use. The torsion spring is installed about the pin 30, on both sides, each leg of the torsion spring 34 has attached a ball 36 and 38. The traction assembly 24 is configured to slidably move the traction element 22 through an arcuate path controllably from the retracted to the extended modes, or vice versa. The fixed end 42 of the elastomeric leaf 32 is configured to be attached to the traction hub 44 (see FIG. 2), while the free end 44 is coupled to the traction assembly 24 through the pin 30 passing through the housing 25, to permit the traction assembly 24 to pivot. The free end 40 is permitted to flex relative to the fixed end 42.

Turning now to FIGS. 2A-E, the assembled traction device 20 is shown with the traction hub 44 at the center, with eight exemplary traction assemblies 24 mounted radially about the traction hub 44, although any number of traction assemblies 24 may be mounted. The traction device 20 is shown ready to be installed within a rim. The traction assemblies 24 are each coupled to the traction hub 44 by the elastomeric leaf 32 installed through the slot 33. One potential means to secure the fixed end 42 (hidden) to the traction hub 44, is by a common fastening means, such as a nut and bolt. The traction assembly 24 is permitted to move relative to the traction hub 44 with multiple degrees of freedom, as illustrated by the three curved arrows representing rotation about a vertical and two horizontal axes.

Figure 2A:
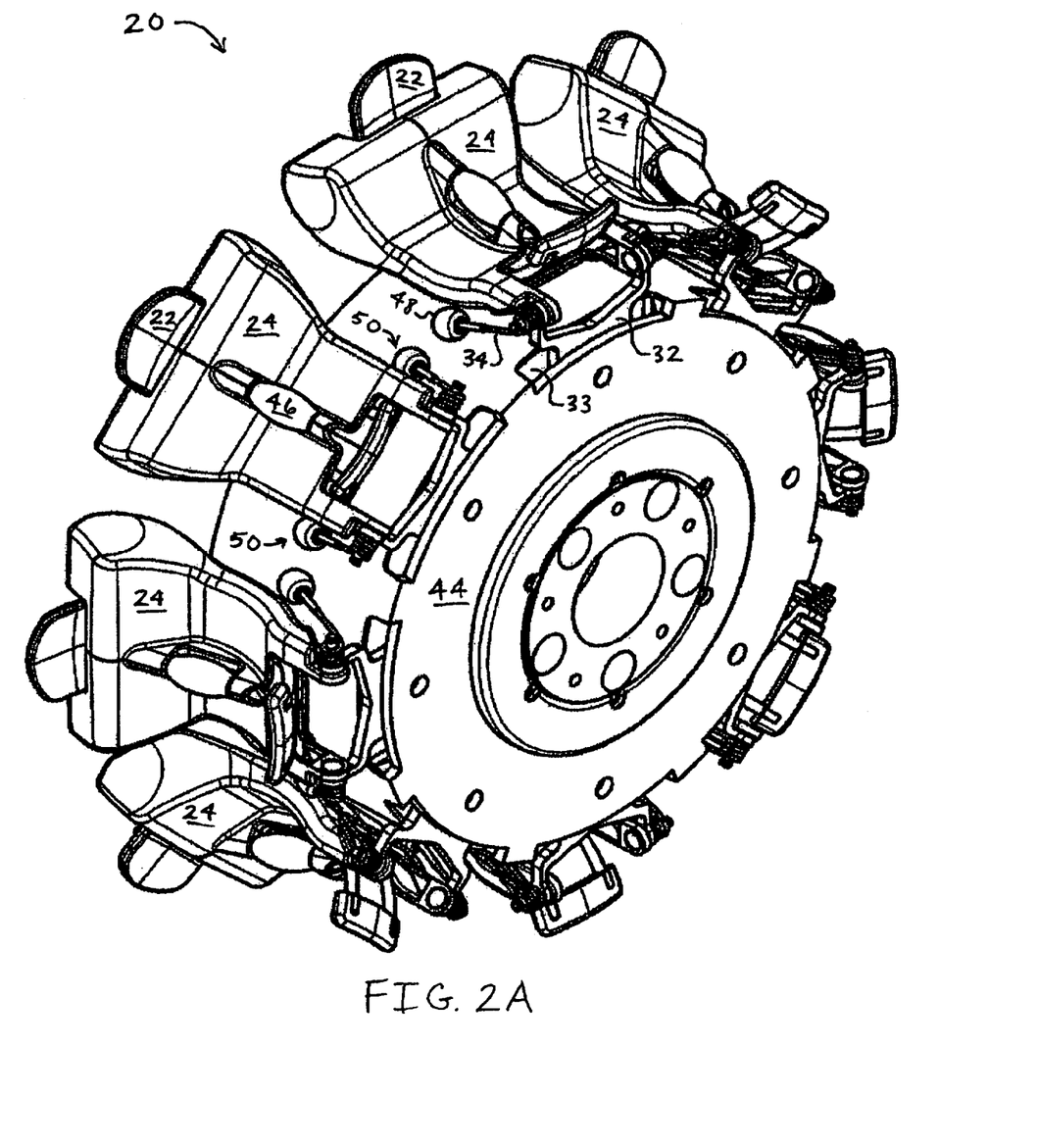
FIG. 2A-E are perspective views of the preferred embodiment of the present invention, showing the traction assemblies coupled to the traction hub through the resilient coupling means and showing the axes of rotation and translation.
Figure 2B:
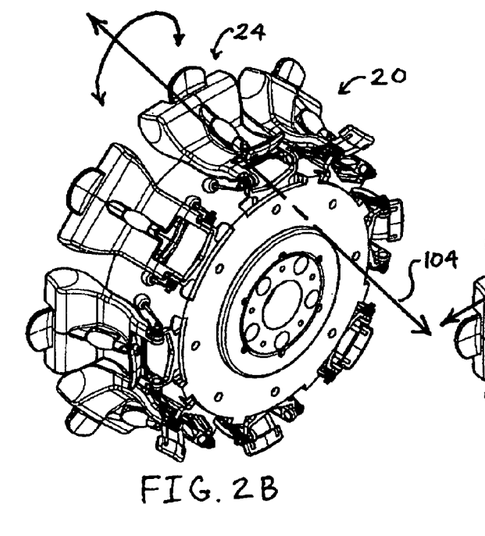
Figure 2C:
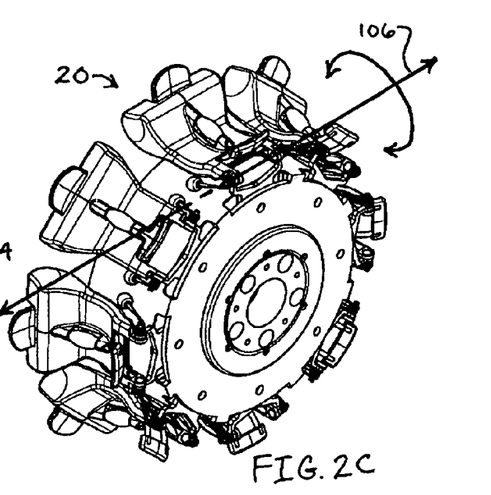
Figure 2D:
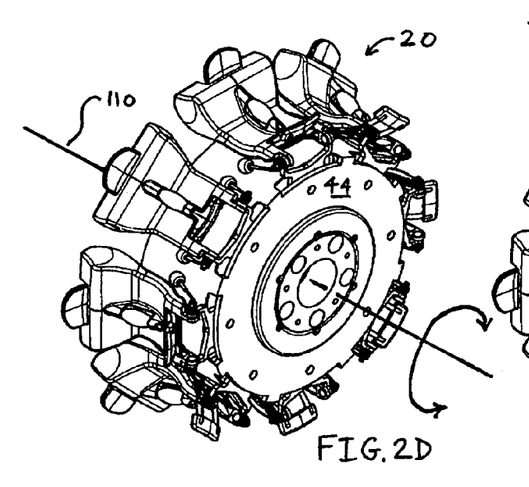
Figure 2E:
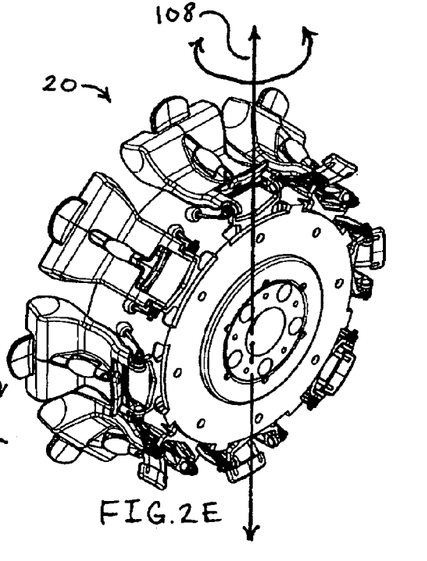

Looking particularly at FIGS. 2B-E, the traction device is shown with the axes that motion is permitted over. The traction element itself is permitted to move with six degrees of freedom, essentially translation in three axes and rotation in three axes. The traction hub 44 itself is also permitted to rotate with one degree of freedom, carrying the traction assemblies along. In FIG. 2B, an axis 104 passes through the traction assembly 24 with an arrow at each end, representing translation along that axis 104 and a curved, double-ended arrow indicating rotation about that axis 104, representing two degrees of freedom for the traction assembly 24. Likewise, two more degrees of freedom are visually indicated in FIG. 2C through axis 106 and in FIG. 2E through axis 108, for a total of six degrees of freedom. The traction hub 44 rotates with one degree of freedom about axis 110.

The torsion spring 34 is shown with the balls 36 and 38 installed within the sockets 48 to create two ball and socket joints 50. It can be seen that the torsion spring is arranged to bias the traction assembly 24 away from the traction hub 44, pivoting about the pins 30. The traction hub 44 is preferably open-ended drum shaped to permit mounting on the inner side of the rim, to permit clearance for the brakes and other mechanics.

Figures 3, 4:
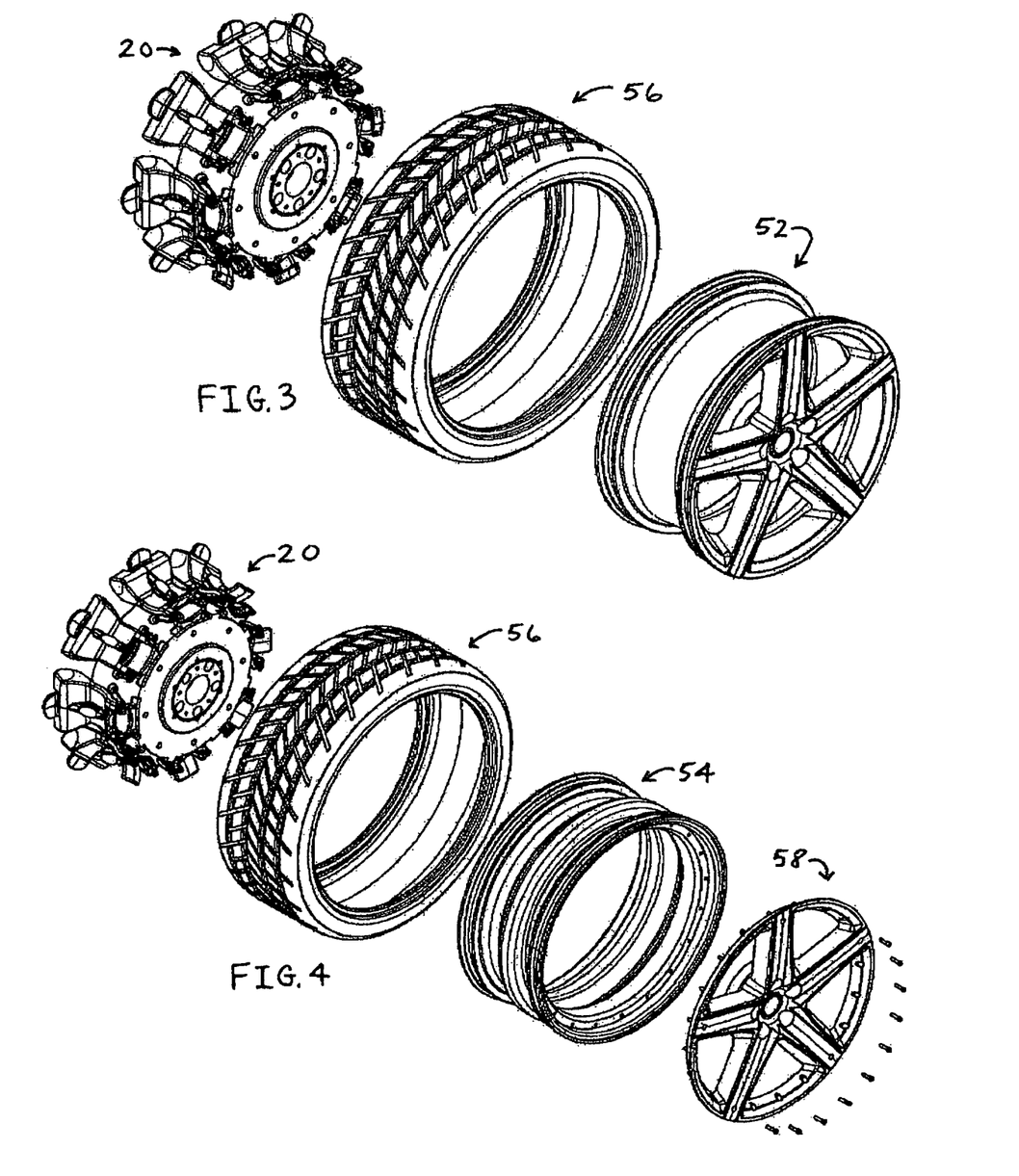
FIG. 3 is an exploded perspective view of an optional embodiment of the present invention, showing how the hub is assembled within a standard rim arrangement.
FIG. 4 is an exploded perspective view of an optional embodiment of the present invention, showing how the hub is assembled within a custom two piece rim arrangement.

FIG. 3 shows the present traction device 20 in an exploded view, along with a tire and industry standard rim 52. The traction device 20 is designed to fit within the industry standard rim 52, without interference with the normal function of the car's equipment.

FIG. 4 alternative shows a traction device 20, again in exploded view with the tire 56 and a custom rim 54. A custom rim 54 is one that is designed specifically for use with the traction device 20, providing clearances and design features that will be later described. A hub 58 can be attached to the custom rim 54, or it can be crafted as a one-piece design.

Figure 5A:
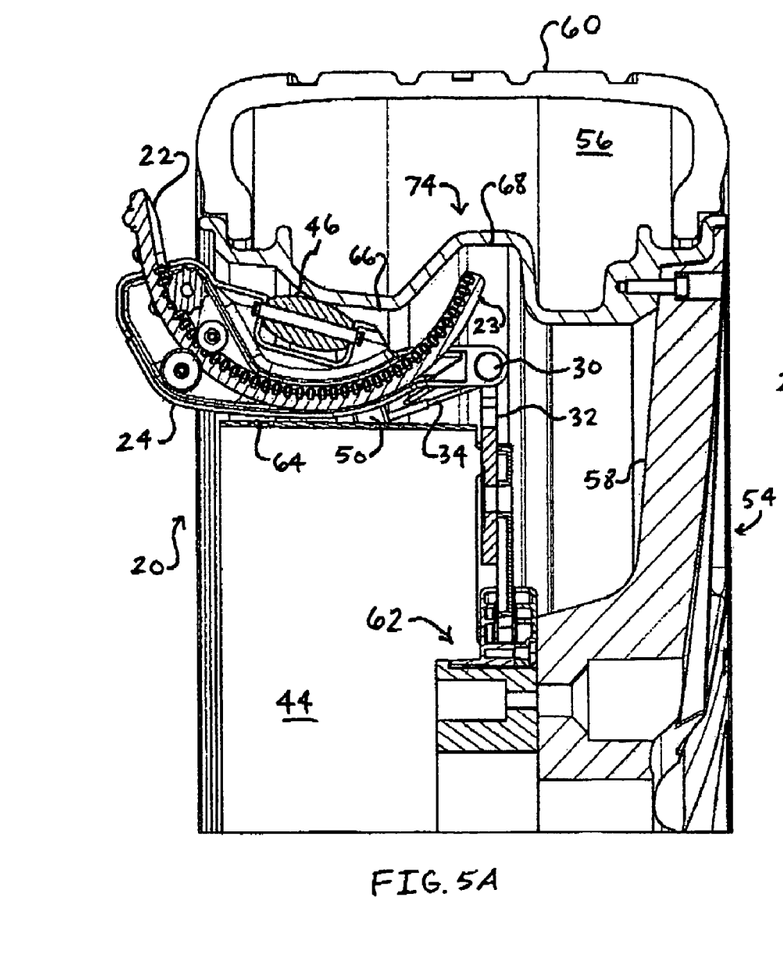
FIGS. 5A-B are cross-sectional views of the present invention shown installed on a custom two piece rim arrangement, showing the extended and retracted modes with a motor driven traction element.
Figure 5B:
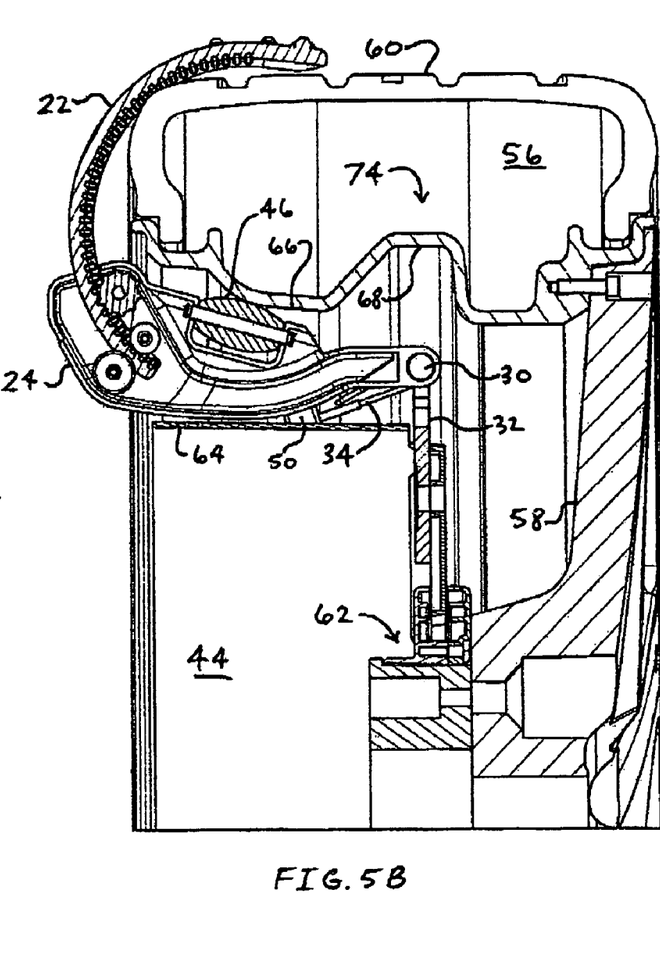
Figure 9:
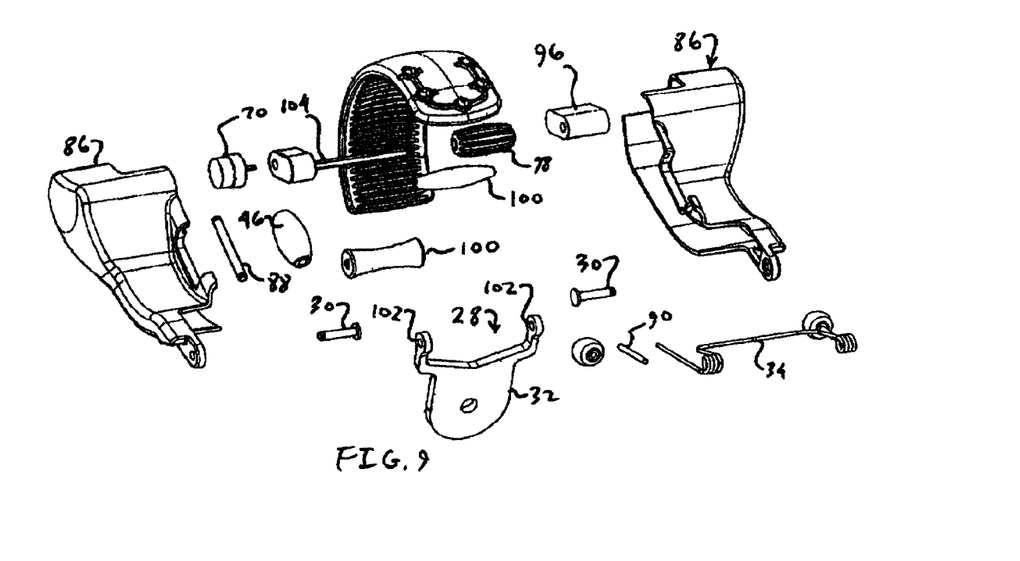
FIG. 9 is an exploded perspective view of the traction assembly of the present invention, showing the motor driven option.

A cross section of the traction device 20 installed on a custom rim 54 can be seen in FIGS. 5A and 5B, the traction element 22 optionally driven by a motor 70 (as seen in FIG. 9), such as a stepper motor or the like. FIG. 5A shows the traction element 22 in the retracted mode. In the retracted mode, a portion 23 of the traction element 22 can be seen lying within an annular recess 68, which provides clearance so that the traction element 22 may freely retract without impacting the custom rim 54 or other interference. A rotatable coupling means 62 permits the traction hub 44 to rotate relative to the custom rim 54. This can be any number of means that permits rotation, such as a bearing or series of bearings.

The traction assembly 24 is installed between the outer diameter 64 of the traction element 44 and the inner diameter 66 of the custom rim 54. The elastomeric leaf 32 attaches the traction assembly 24 to the traction hub 44. As previously described, the torsion spring 34 biases the traction assembly towards the inner diameter 66 to push the roller 46 against the inner diameter 66, with the roller 46 preventing abrasion between the traction assembly 24 and the inner diameter 66 when the traction hub 44 rotates relative to the custom rim 54. The torsion spring 34 also acts to bias the traction assembly 24 towards an original position.

Moving to FIG. 5B, the traction element 22 is seen in the extended mode, where it partially overlies the tread 60 of the tire 56 to provide enhanced traction. The design of the traction element 22 is curved in profile so that it can easily tuck away within the custom rim 54 when not in use, or extended over the tread 60 when in use. The arcuate path between the extended and retracted mode may be visually interpolated by comparing FIG. 5A with FIG. 5B.

Figure 6A:
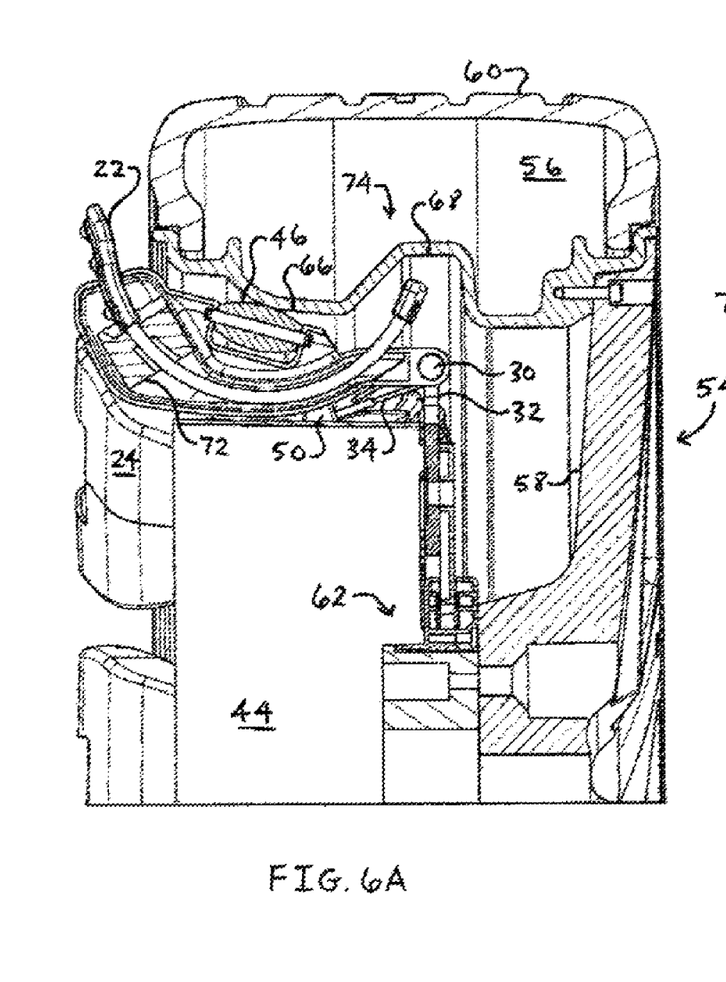
FIGS. 6A-B are cross-sectional views of the present invention shown installed on a custom two piece rim arrangement, showing the extended and retracted modes with an actuator driven traction element.
Figure 6B:
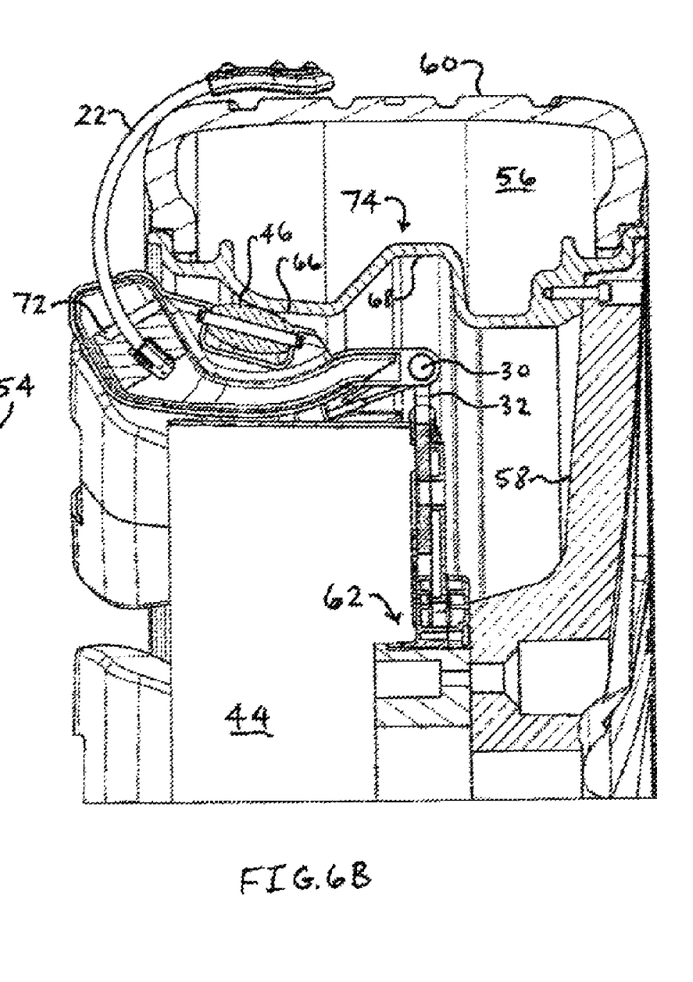

Yet another option is seen in FIGS. 6A and 6B, showing the option of driving the traction element 22 by use of an actuator 72. A variety of actuators 72 may be chosen, such as electro-mechanical actuators, hydraulic actuators, or other appropriate actuator device.

Figures 7A, 7B, 7C:
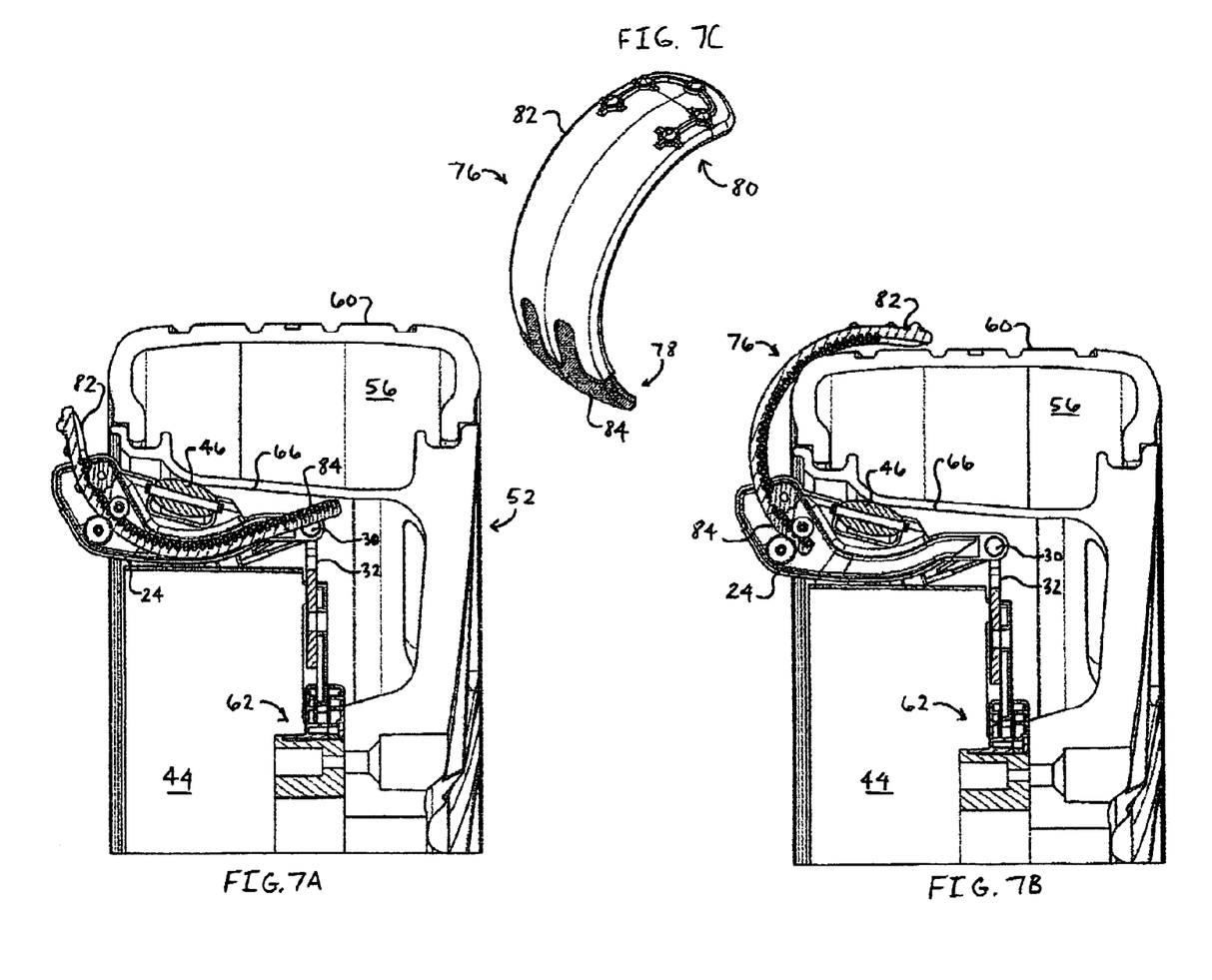
FIGS. 7A-C are cross-sectional views of the optional embodiment of the present invention shown installed on a standard or OEM rim arrangement, showing the extended and retracted modes and the deformable traction element.

When viewing FIGS. 7A-7C, an optional variation if the present invention can be seen in use with an industry standard rim 52. FIG. 7C shows an optional curved traction element 76, in this exemplary embodiment, comprised of two different materials, a free end material 82 and a secured end material 84. To permit flexing of the secured end 78 while maintaining the at least semi rigidity of the free end 80, the Young's modulus of the free end material 82 is greater than the Young's modulus of the secured end material 84. The advantage of the more flexible secured end 78 can be seen in FIG. 7A, where the curved traction element 76 is in the retracted mode and the secured end 78 is touching the inner diameter 66 of the standard rim 52, being deflected down as a result. Instead of the curved traction element 76 impacting the inner diameter 66 with dysfunctional interference, the secured end 78 is permitted to bend upon contacting the inner diameter 66, allowing the full retraction of the curved traction element 76.

Other embodiments are also available to create a curved traction element 76 that permits the flexure of the fixed end 78, such as a change in the material cross section to permit a localized weakness to permit bending thereat or the hinging of the secured end 78 to the free end 80, again to permit flexure at the hinge. Likewise, while maintaining the inventive concept of the present invention, many other optional embodiments are available for utilization that permit the deflection of the fixed end 78.

Figure 8:
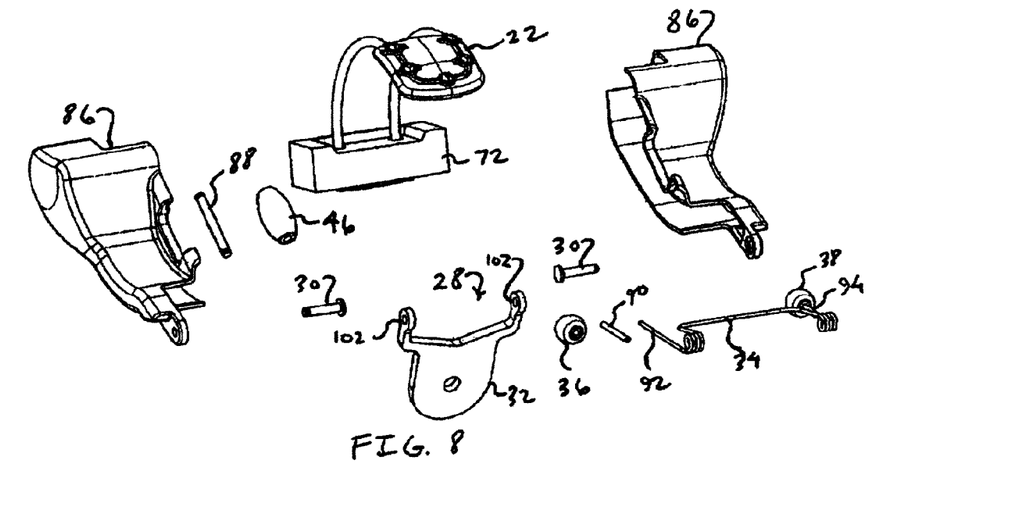
FIG. 8 is an exploded perspective view of the traction assembly of the present invention, showing the actuator driven option.

FIGS. 8 and 9 show the traction assembly 24 in an exploded view, FIG. 8 showing the actuator 72 option and FIG. 9 showing the motor 70 option. Looking first at FIG. 8, two housing halves 86 comprise the outer shell or housing 25 of the traction assembly 24. A roller 46 may be mounted about a roller pin 88, held in place on the traction assembly 24. In this case, two pins 30 are each inserted through a respective hole 102 in the elastomeric leaf 32; each pin 30, in turn is supported by the housing 22, to permit the traction assembly to rotate about the pin. The torsion spring 34 is supported about the pins 30 and has two legs, the first leg 92 and second leg 94 with a ball 36 and 38 at the terminus of each leg 92 and 94 respectively. Each leg 92 and 94 is inserted into a sleeve 90 for engagement to the balls 36 and 38. The actuator 72 drives the traction element 22.

The motor 70 driven variation shown in FIG. 9 is substantially similar to the actuator 72 version, except the motor 70 support mechanisms, such as the drive 104, the drive gear 98, the guide rollers 100, and the counterbalance 96. The counterbalance serves to enhance the rotational balancing of the entire assembly of the rim 52, the tire 56 and the traction device 20.

While particular forms of the invention have been illustrated and described, it will also be apparent to those skilled in the art that various modifications can be made without departing from the spirit and scope of the invention. Accordingly, it is not intended that the invention be limited except by the claims.

What is claimed is:

1. A traction device coupled to a rim and configured to selectively extend over a tire tread, comprising:
   a traction assembly having a traction element slidably fitted therein configured to selectively slide to extend over the tire tread;
   a traction hub coupled to said rim about a common rotation axis through a bearing, permitting the rotation of said traction hub about said common axis in response to a tire-roadway interaction force; and
   a resilient coupler forming an elastic connection between said traction assembly and said traction hub permit the repositioning of said traction assembly in response to a said tire-roadway interaction force exerted on and transmitted through said traction element while extended over said tire tread.

2. The traction device of claim 1 wherein said resilient coupler is an elastomeric leaf permitting the repositioning of said traction assembly relative to said traction hub.

3. The traction device of claim 1 wherein said traction assembly is radially mounted on a traction hub through said resilient coupler.

4. The traction device of claim 1 wherein said resilient coupler comprises an elastomeric leaf having a pin at a free end about which said traction assembly is pivotally coupled and being secured to said traction hub by a fixed end.

5. The traction device of claim 1 further comprising a biasing means urging said traction assembly back to an original position.

6. The traction device of claim 5 wherein said biasing means is a torsion spring, a first leg and a second leg of said torsion spring each having attached at a terminus a ball configured to mate within a respective socket on said traction hub outer diameter, two ball and socket joints being formed to facilitate the positional restoration of said traction assembly.

7. The traction assembly of claim 5 wherein said biasing means urges said traction assembly towards said rim inner diameter, a roller being mounted to said traction assembly and configured to contact said rim inner diameter being biased thereto by said biasing means, said roller substantially preventing said traction assembly from abrading said rim inner diameter during repositioning.

8. The traction device of claim 1 wherein a biasing means biases the traction assembly proximate to an original position.

9. The traction device of claim 5 wherein said biasing means is a torsion spring.

10. The traction device of claim 1 wherein said resilient coupler comprises a spring.

11. A traction device for mounting to a wheel having an inner diameter and a tire tread mounted thereon comprising:
    a traction assembly having a traction element configured to extend over the tire tread, the traction assembly elastically mounted by a resilient coupler to an outer diameter of a traction hub fitted within the inner diameter of the wheel, the traction hub coupled to the wheel through a bearing to permit the rotation of the traction hub relative to the wheel;
    a spring urging the traction assembly away from the traction hub and towards the inner diameter of the wheel; and
    a roller fitted between the traction assembly and the inner diameter of the wheel and configured to contact the inner diameter under bias of the spring, the roller substantially preventing the traction assembly from abrading the inner diameter during repositioning.

12. The traction device of claim 11 wherein, the biasing means is a torsion spring, a first leg and a second leg of the torsion spring each having attached at a terminus a ball configured to mate within a respective socket on the outer diameter of the traction hub, a pair of ball and socket joints being thereby formed to facilitate the positional restoration of the traction assembly.

13. The traction device of claim 11 wherein, the traction element is configured to slide to extend over the tire tread upon activation.

* * * * *